United States Patent
Ratner et al.

(10) Patent No.: US 6,959,117 B2
(45) Date of Patent: Oct. 25, 2005

(54) METHOD AND APPARATUS FOR DEBLURRING AND RE-BLURRING IMAGE SEGMENTS

(75) Inventors: Edward Ratner, Sunnyvale, CA (US); Adityo Prakash, Redwood Shores, CA (US); Oliver W. Shih, San Jose, CA (US); Carroll Philip Gossett, Mt. View, CA (US)

(73) Assignee: PTS Corporation, San Jose, CA (US)

( * ) Notice: Subject to any disclaimer, the term of this patent is extended or adjusted under 35 U.S.C. 154(b) by 619 days.

(21) Appl. No.: 10/027,924

(22) Filed: Dec. 19, 2001

(65) Prior Publication Data

US 2002/0114532 A1 Aug. 22, 2002

Related U.S. Application Data

(60) Provisional application No. 60/257,934, filed on Dec. 19, 2000.

(51) Int. Cl.[7] .................................................. G06K 9/40
(52) U.S. Cl. ......................... 382/255; 382/263; 382/264
(58) Field of Search .................................. 382/255, 263, 382/264, 266–269, 274, 275

(56) References Cited

U.S. PATENT DOCUMENTS

| | | | | |
|---|---|---|---|---|
| 5,070,413 A | * | 12/1991 | Sullivan et al. | 358/3.03 |
| 5,198,902 A | * | 3/1993 | Richards et al. | 348/598 |
| 5,668,940 A | | 9/1997 | Steiner et al. | 345/592 |
| 5,974,172 A | * | 10/1999 | Chen | 382/166 |
| 5,995,111 A | * | 11/1999 | Morioka et al. | 345/592 |
| 6,115,078 A | * | 9/2000 | Kino | 348/625 |
| 6,452,637 B1 | * | 9/2002 | Rudin et al. | 348/416.1 |
| 6,547,736 B1 | * | 4/2003 | Moehring et al. | 600/454 |
| 6,606,093 B1 | * | 8/2003 | Gossett et al. | 345/441 |

FOREIGN PATENT DOCUMENTS

| | | | | |
|---|---|---|---|---|
| GB | 2 280 812 A | | 2/1995 | G06T/5/00 |
| WO | WO 00/64167 A1 | | 10/2000 | H04N/7/12 |
| WO | WO 00/77735 A1 | | 12/2000 | G06T/5/00 |

* cited by examiner

*Primary Examiner*—Bhavesh M. Mehta
*Assistant Examiner*—Dennis Rosario
(74) *Attorney, Agent, or Firm*—Okamoto & Benedicto LLP

(57) ABSTRACT

Using image segmentation in video compression brings about a limitation in video quality when a segment moves in position from frame to frame. The limitation arises because color contributions (bleeding or blurring) naturally occur between neighboring segments. The above-identified problem is overcome by providing solutions to compensate for color contributions between neighboring segments. In accordance with one embodiment, a method and apparatus de-blurs an image segment. De-blurring involves removing from the segment approximate color contributions from neighboring segments. This results in a segment that is approximately independent of color contributions from neighboring segments. In accordance with another embodiment, a method and apparatus re-blurs an image segment. Re-blurring involves adding to the segment approximate color contributions from a new arrangement of neighboring segments. This results in more realistic rendering of the segment, as it is located in the new arrangement.

15 Claims, 19 Drawing Sheets

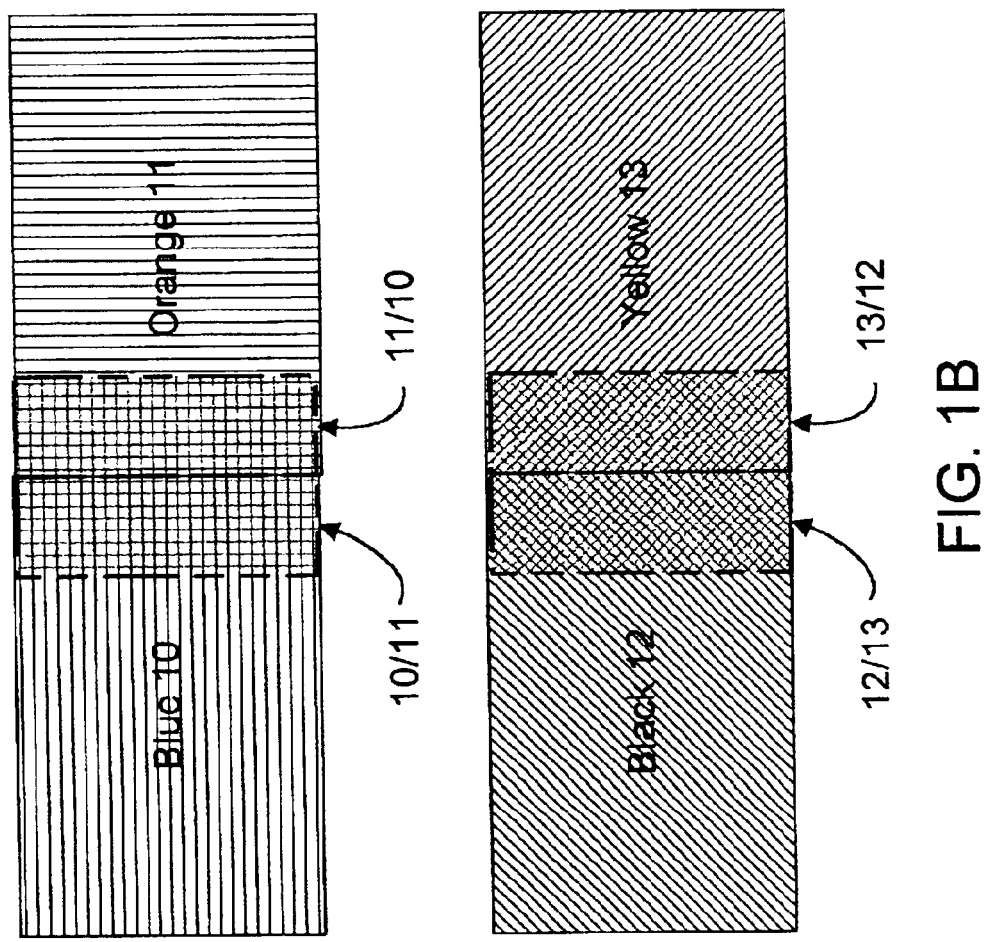

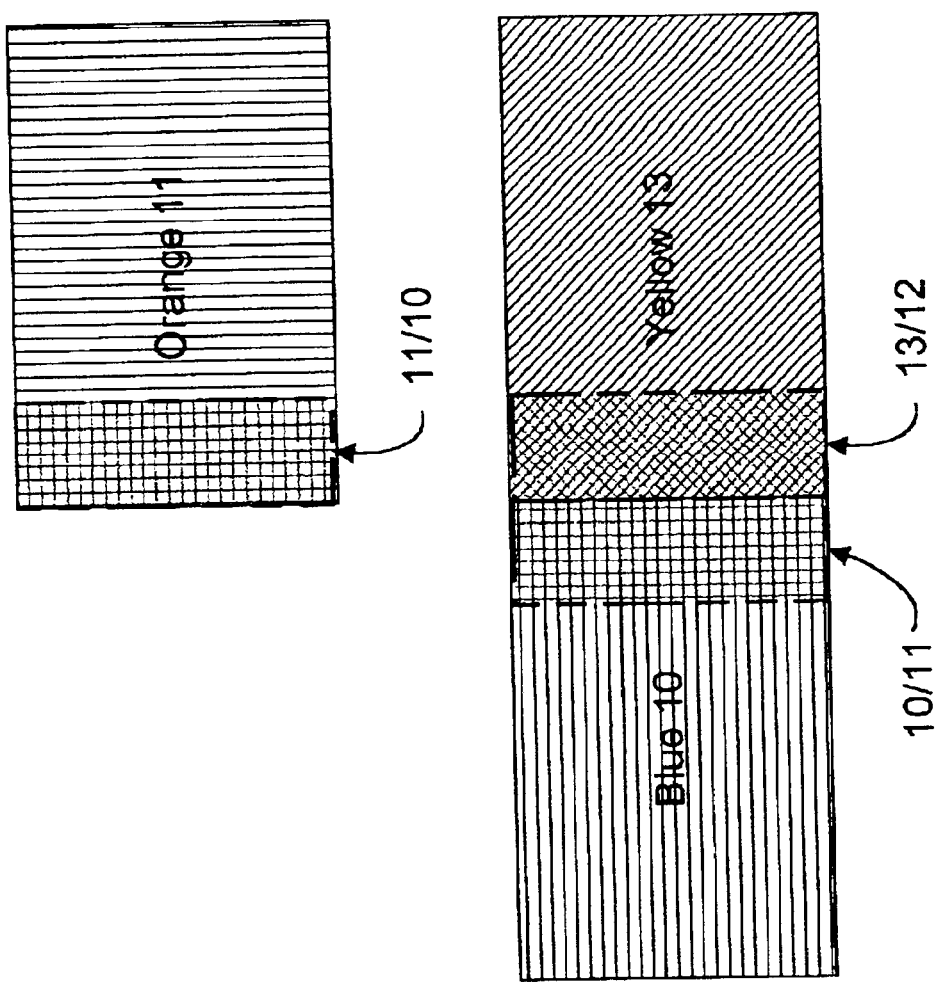

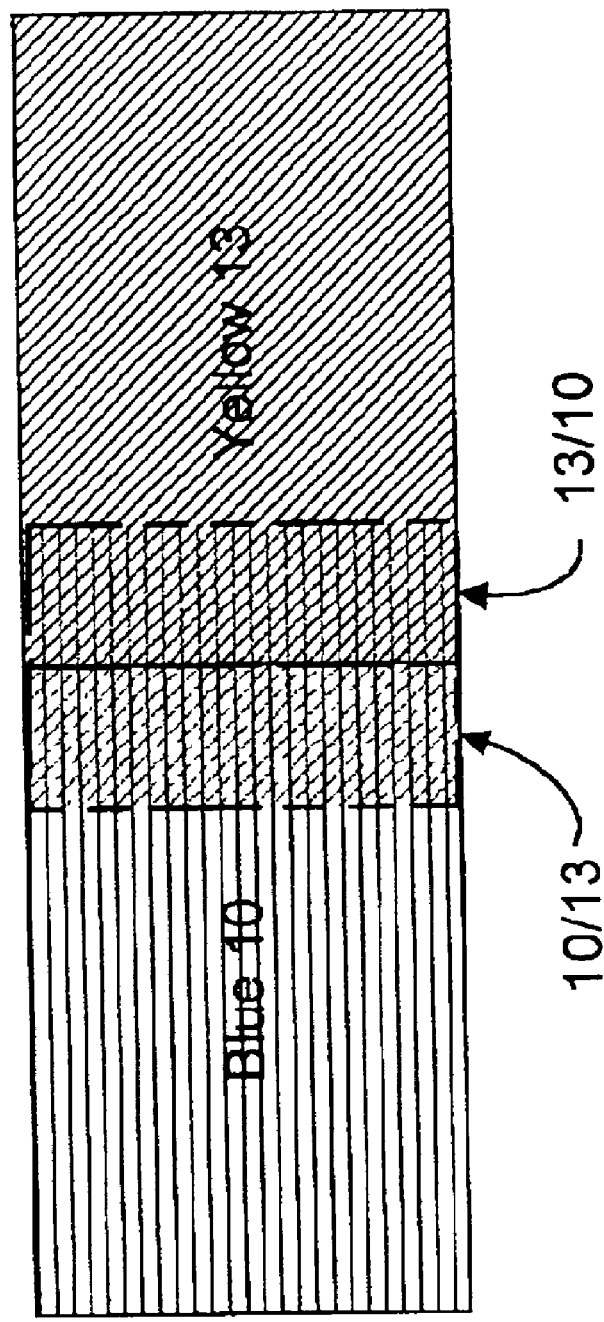

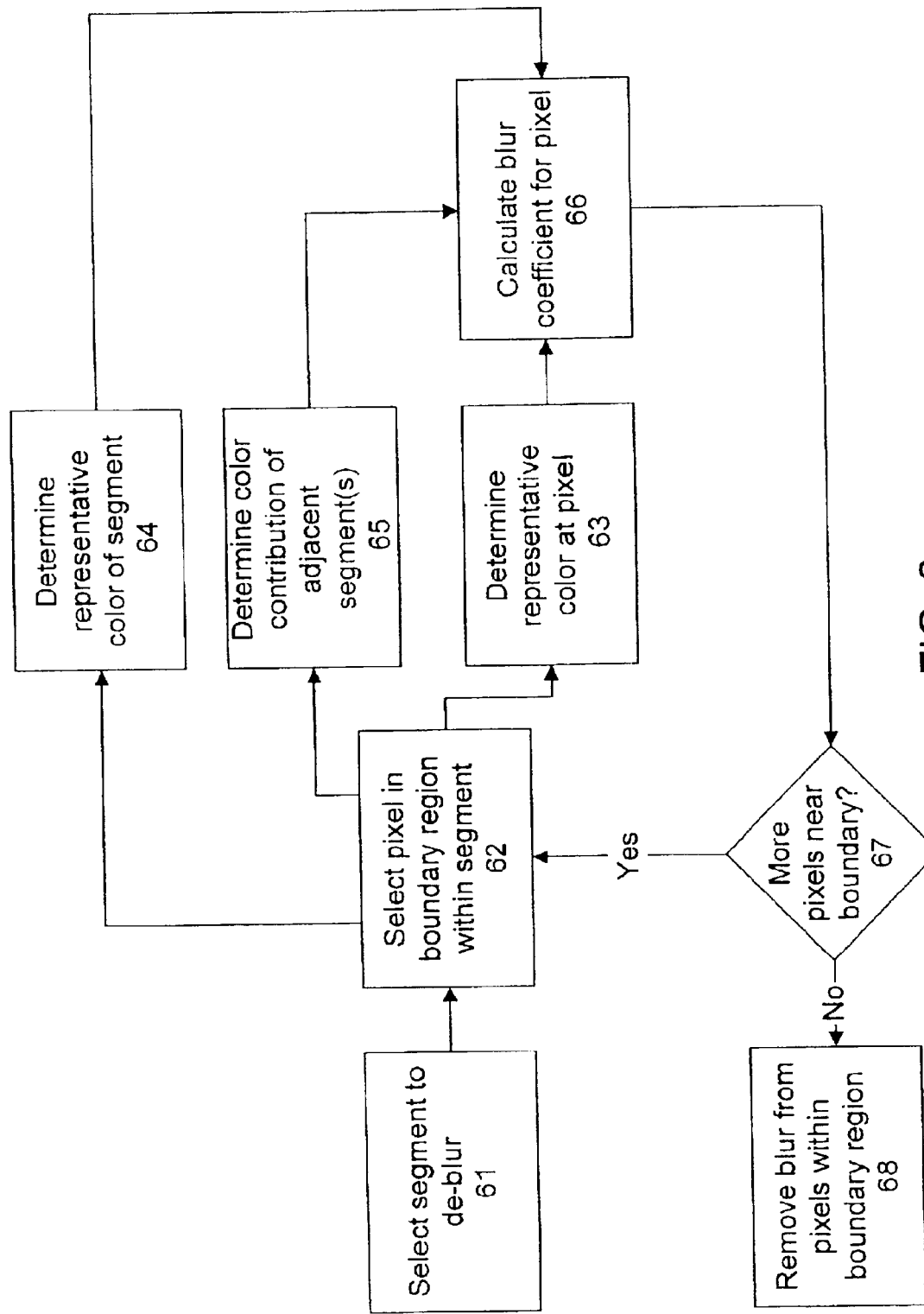

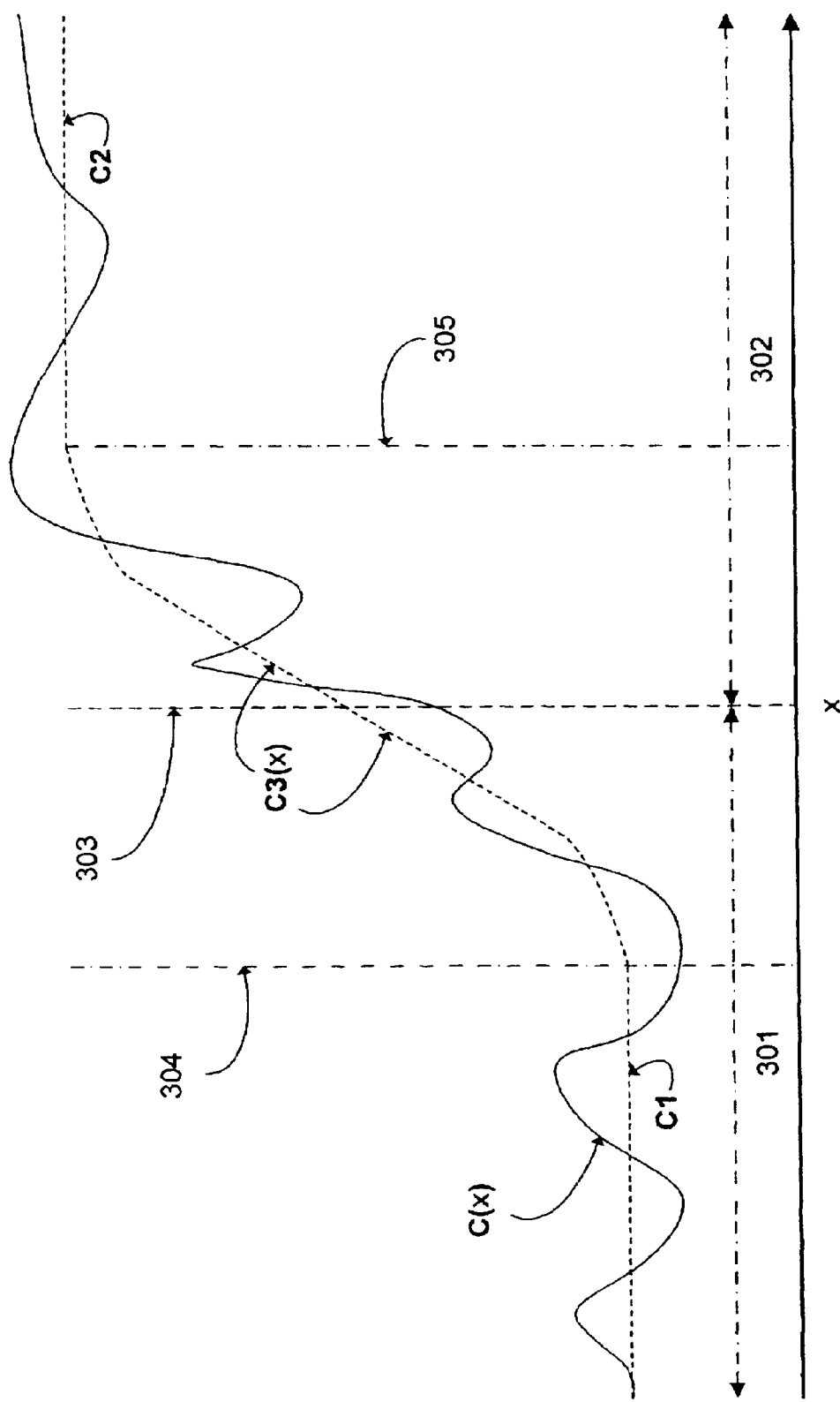

METHOD AND APPARATUS FOR DEBLURRING AND RE-BLURRING IMAGE SEGMENTS

CROSS-REFERENCES TO RELATED APPLICATIONS

This invention claims priority from U.S. Provisional Patent Application No. 60/257,934, filed Dec. 19, 2000 and entitled "Method for Removing and Adding Blurring to and from Segments of a Segmented Image," the disclosure of which is incorporated herein by reference for all purposes. This invention is related to U.S. patent application Ser. No. 09/591,438, filed Jun. 9, 2000 and entitled "Method and Apparatus for Digital Image Segmentation" (hereinafter "Prakash II"), the disclosure of which is incorporated herein by reference for all purposes. This invention is related to U.S. patent application Ser. No. 09/550,705, filed Apr. 17, 2000 and entitled "Method and Apparatus for Efficient Video Processing" (hereinafter "Prakash I"), the disclosure of which is incorporated herein by reference for all purposes.

FIELD OF THE INVENTION

The present invention relates in general to image processing. More particularly, the present invention relates to video compression and image segmentation.

DESCRIPTION OF THE BACKGROUND ART

The world's technologies for communication, information and entertainment is steadily becoming digital. As part of this trend, still pictures are being stored and transmitted digitally; video is being transmitted and stored in digital form. Digital images and video together constitute an extremely important aspect of modem communication and information infrastructure. Efficient methods for processing multi-dimensional signals such as digital video and images are of deep technological significance. Examples of common application areas where such sophisticated processing is absolutely necessary include image and video compression for efficient video storage and delivery, manipulation of digital images and video frames for effective generation of artificial scenes, image or video enhancement etc.

Blurred Boundaries

Most digital images show objects delineated by boundaries which are not sharp. Boundaries can be considered as those regions between objects that indicate where one object ends and the next one begins. They help outline the various objects and help the eye distinguish and identify one object from another. In general, most visual images represented with pixels do not represent the boundaries as locations of sharp discontinuous changes in pixel values. The extent of an object would not normally end at one pixel with the adjacent object beginning the next pixel over. Instead of ending abruptly, the extent of one object disappears slowly into its neighbor and vice versa. Magnifying the image, one would see that the colors of adjacent objects bleed into each other across their edges. The extent over which this blending takes places gives the boundary a finite width and makes the boundaries appear fuzzy and spread out. Where one object starts and where its adjacent neighbor ends becomes less certain. The boundary between the two objects thus becomes wider. The width of the boundary is typically several pixels, five for example, but can vary from one pixel to ten or more. The widening of the boundaries has the effect of making the image look blurrier. The width of the boundaries can be used as a measure of the blurriness in the image.

Boundaries in an image can become blurry for several reasons. One reason is the finite resolution of the device used to record the image. The finite dimensions of the focussing optics and the granular or discrete nature of the recording media (grains in film or pixels in a CCD sensor) yield a certain resolving power that can distinguish between features of a certain size but no smaller. Features normally are not sharper or smaller than the resolving power of the recording device. Thus, edges and boundaries do not appear infinitely sharp but have a small but finite width instead. Another reason is the motion of objects. The recording media requires a finite amount of time to be exposed during which the object can move around. As the object moves, the edge of the object moves across the recording media yielding a wider boundary and a blurrier looking object. Blurry boundaries can also result from atmospheric disturbances (hot rising air, smoke, haze, etc.) that can diffuse the light from a single spatial point onto different areas in the recording media. Low contrast between the colors of adjacent objects and low light levels can also have the effect of blending the color of one object into the color of its adjacent object. Thus, images depicting realistic looking scenes tend to have blurry boundaries.

Video Compression

Although the field of the invention is not limited to video compression, in the context of video compression since a number of the same objects move around in a scene spanning several video frames, one attempts to create shortcuts for describing a current video frame being encoded or compressed in relation to other video frames that have already been transmitted or stored in the bit stream through a process of identification of portions of the current frame w/other portions of previously sent frames. This process is known as motion compensation. In technologies such a MPEG 1, 2 and 4 (in simple profile), the image frame is subdivided into square blocks that are then matched to a previously encoded frame and a displacement vector, also called motion vector, is placed in the bit stream indicating that the block in question should be replaced by the corresponding block in a previously encoded frame.

Such block-based motion compensation suffers from the limitation that the objects within most images are not built up of blocks. Such an attempt leads to poor matching and motion compensation. In particular blocks that traverse the boundary of two objects tend to have even poorer matches than others. Hence it becomes desirable to be able to directly manipulate the inherent constituent components in any given video frame, which are the objects or parts of objects, segments of arbitrary shapes (as allowed for instance in MPEG4 or as disclosed in "Method and Apparatus for Digital Image Segmentation," International Publication Number WO 00/77735, applicant Pulsent Corporation, inventors A. Prakash, E. Ratner, J. S. Chen, and D. L. Cook, published Dec. 21, 2000) as the fundamental entities for use in motion compensation. Furthermore, applications such as artificial scene generation requires manipulation and placement of objects or segments in new locations. Image and video enhancement applications also need processing of the object segment.

SUMMARY

In accordance with one embodiment of the invention, a method and apparatus for video processing may include de-blurring an image segment. De-blurring an image segment involves removing from the segment approximate color contributions from neighboring segments. This results in an image segment that is approximately independent of color contributions from neighboring segments. Ringing trails may be removed by such de-blurring. However, de-blurring without re-blurring results in a tendency for the image to have segments with stark boundaries, somewhat remeniscient of an impressionistic painting.

In accordance with another embodiment of the invention, a method and apparatus for video processing may include re-blurring an image segment. Re-blurring an image segment involves adding to the segment approximate color contributions from a new configuration of neighboring segments. This results in a more realistic rendering of the image segment, as it is located in the new configuration. Stark boundaries of segments may be softened realistically by such re-blurring to re-create approximately the same amount of blur previously removed.

BRIEF DESCRIPTION OF THE DRAWINGS

FIG. 1B is an illustrative diagram of the two pairs of neighboring image segments showing adjacent segments bleeding or blurring into each other.

FIG. 1C is an illustrative diagram showing the result of movement placing a segment from the first pair next to a segment from the second pair to form a new pair with incorrect bleed or blur.

FIG. 1D is an illustrative diagram showing the result of correcting the bleed or blur in the newly adjacent segments in accordance with an embodiment of the invention.

FIG. 6 is a flow chart illustrating a process or method for de-blurring in accordance with an embodiment of the invention.

FIG. 13 is a graph depicting in a conceptual way color blurring between two adjacent segments in accordance with an embodiment of the invention.

DETAILED DESCRIPTION

Images as Multi-dimensional Data Signals

Figure 1A:
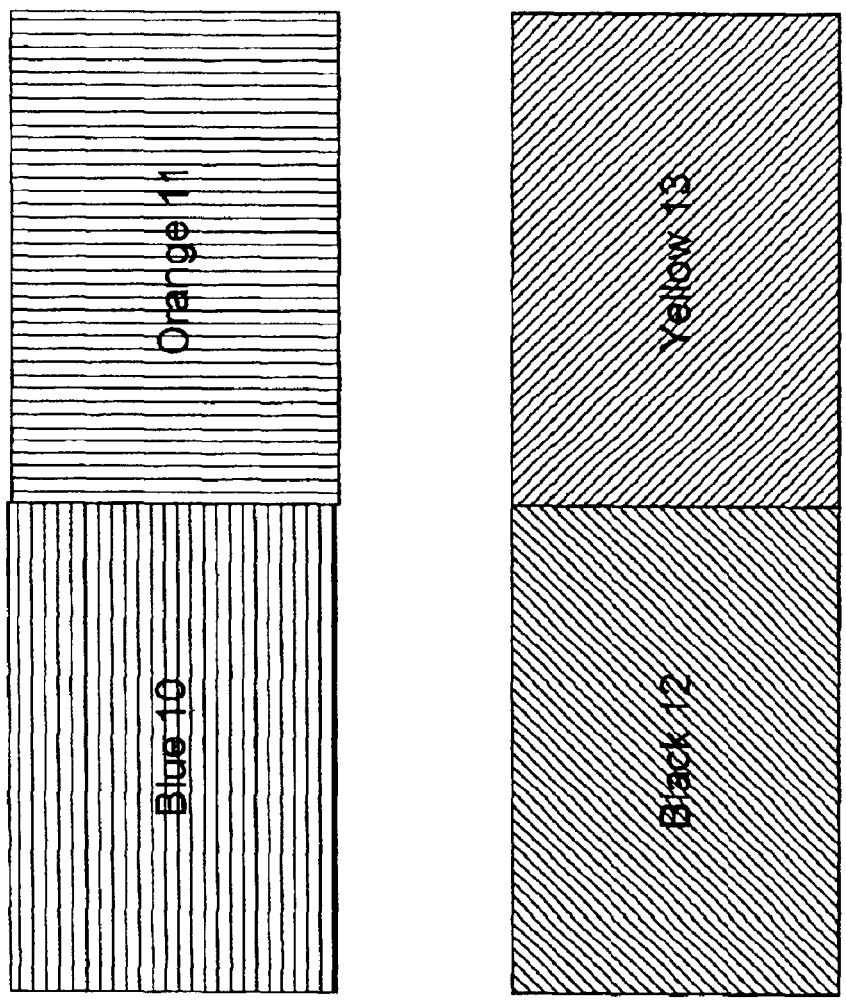
FIG. 1A is an illustrative diagram of two pairs of neighboring image segments without bleeding or blurring.

As the terms are used herein, an image can be represented by data derived from a multi-dimensional signal. The signal might be originated or generated either naturally or artificially. This multi-dimensional signal (where the dimension could be one, two, three or more) may be represented as an array of pixel color values such that pixels placed in an array and colored according to each pixel's color value would represent the image. Each pixel has a location and can be thought of as being a point at that location or as a shape that fills the area around the pixel such that any point within the image is considered to be "in" a pixel's area or considered to be part of the pixel. The image itself might be a multi-dimensional pixel array on a display, on a printed page, an array stored in memory, or a data signal being transmitted and representing the image. The multidimensional pixel array can be a two-dimensional array for a two-dimensional image, a three-dimensional array for a three-dimensional image, or an array of some other number of dimensions.

Pixel color values can be selected from any number of pixel color spaces. One color space in common use is known as the YUV color space, wherein a pixel color value is described by the triplet (Y, U, V), where the Y component refers to a grayscale intensity or luminance, and U and V refer to two chrominance components. The YUV color space is commonly seen in television applications. Another common color space is referred to as the RGB color space, wherein R, G and B refer to the Red, Green and Blue color components, respectively. The RGB color space is commonly seen in computer graphics representations.

Image Segmentation

Image segmentation is the process of partitioning an image into a set of non-overlapping parts, or segments, that together constitute the entire image. Image segmentation is useful for many applications, such as image or video processing.

The image can be an image of a physical space or a plane or an image of a simulated and/or computer-generated space or plane. In the computer graphic arts, a common image is a two-dimensional view of a computer-generated three-dimensional space (such as a geometric model of objects and light sources in a three-space). An image can be a single image or one of a plurality of images that, when arranged in a suitable time order, form a moving image, herein referred to as a video sequence.

When an image is segmented, the image is represented by a plurality of segments. The degenerate case of a single segment comprising the entire image is within the definition of segment used here, but the typical segmentation divides an image into at least two segments. In many images, the segmentation divides the image into a background segment and one or more foreground segments.

In one segmentation method, an image is segmented such that each segment represents a segment of the image where the pixel color values are more or less uniform within the segment, but dramatically change at the edges of the image.

In that implementation, the segments are connected; i.e., it is possible to move pixel-by-pixel from any one pixel in the segment to any other pixel in the segment without going outside the segment. Further details on this particular segmentation method may be found in "Method and Apparatus for Digital Image Segmentation," International Publication Number WO 00/77735 A1, published Dec. 21, 2000, by applicant Pulsent Corporation.

Of particular relevance to the present invention, at the boundaries between image segments there is often a certain level of bleeding or blurring. Bleeding can occur due to various reasons including, but not limited to, the segment being in motion when the image was captured and focus-related effects. Therefore, color from one or more adjacent image segments may cross segment boundaries and be introduced into other adjacent segments. Bleeding between segments is typically desirable because otherwise the boundaries between the segments would be rather abrupt, and abrupt boundaries usually make for an artificial and less realistic looking image. This turns out to be fundamental to anti-aliased representation of a high resolution signal on a low resolution lattice. A reason behind this is that digital camera CCDs (charge coupled devices) in effect do a tiny averaging around their locations which leads to inherent blurring.

Need for Deblurring and Reblurring

The removal and restoration of blur from boundaries is important for segment-based image manipulation. The blur across the boundary depends upon the segments on both sides of the boundary. If the segments change, then the blur normally changes too. Manipulating segments for the purpose of video compression, creating artificial images, and so on can change the segments on either side of a boundary. For example, as described in "Method and Apparatus for Efficient Video Processing," International Publication Number WO 00/64167, published Oct. 26, 2000 by applicant Pulsent Corporation, the segments in one frame are moved to new positions to create the next frame in a video sequence. The segments are physically moved around in the image and can end up with different neighboring segments. The boundaries between the new neighboring segments must be appropriately blurred with the colors of the neighboring segments in order to look natural. However, moving the segments not only moves the interior colors of the segments but also the blur contributions along the boundary from their previous neighbors. Since these blur contributions originated from the segment's previous neighbors, they will not appear to belong to the segment's new neighbors and thus appear visually as an unsightly ring of discordant color along the boundary. The boundary will then not appear as a smooth blurring between the colors of the segment and its neighbors. This problem commonly appears when moving segments around.

The following body describes a novel solution to this problem. In general, the blurry colors near the borders of object-based segments should be removed before moving the segments around. This removal of blur color is called deblurring. Conversely, after the segments have been moved, the blurriness at the border between the segments will need to be restored. This addition of blur color is called reblurring. The image itself has enough information to determine the degree and extent of the blur as well as the shape and profile of the blur. This information can be used to recreate the blurriness across boundaries in a natural way even when segments move from one location to another in the image.

Deblurring and reblurring the boundaries of object-based segments is important because these kinds of boundaries represent the extent of real physical objects. Real objects can move and these boundaries must always look natural even after movement. The segments associated with the objects will move as well, and to reproduce the natural look of the borders between segments after movement requires deblurring and reblurring.

Another important application of deblurring/reblurring in the context of object-based segments is the blurring and sharpening of the whole image. Since the degree of the reblurring is controllable, the degree of blurriness across the segment borders is controllable. Since the segment borders often correspond to the boundaries of real objects, changing the degree of blurriness has the effect of sharpening or blurring the image. This allows for an alternative way to sharpen pictures.

DETAILED DESCRIPTION OF THE DRAWINGS

FIG. 1A is an illustrative diagram of two pairs of neighboring image segments without bleeding or blurring. FIG. 1A is composed of 4 image segments, segments 10, 11, 12 and 13, as shown. Segment 10 is a blue rectangle, segment 11 is an orange rectangle, segment 12 is a black rectangle, and segment 13 is a yellow rectangle. Segments 10 and 11 are adjacent, as are segments 12 and 13. As illustrated in FIG. 1A, no bleeding is shown between adjacent segments. However, in practice, there will be some bleeding of color between adjacent segments of a typical image.

Note that the image segments in FIG. 1A have uniform color for purposes of simplicity in explanation. Actual image segments need not have, and typically do not have, uniform color. For example, they may have local color variation sometimes referred to as texture. In addition, the image segments in FIG. 1A have rectangular shape for purposes of simplicity of explanation. Actual image segments need not be, and typically are not, of rectangular shape. The image segments may be of arbitrary shape. For example, they may include curved lines and so on.

FIG. 1B is an illustrative diagram of the two pairs of neighboring image segments showing adjacent segments bleeding or blurring into each other. Towards the right side of segment 10, there will be a small orange contribution from segment 11. This contribution is illustrated in the region labeled 10/11 (for segment 10 with bleeding from segment 11). Similarly, towards the left side of segment 11, there is a small blue contribution from segment 10. This contribution is illustrated in the region labeled 11/10 (for segment 11 with bleeding from segment 10). Similarly, region 12/13 on the right side of segment 12 has a small yellow contribution from segment 13, and region 13/12 on the left side of segment 13 has a small black contribution from segment 12.

FIG. 1C is an illustrative diagram showing the result of movement placing a segment from the first pair next to a segment from the second pair to form a new pair with incorrect bleed or blur. In this case, image segment 10 has moved from its previous position adjacent to image segment 11 to a position adjacent to image segment 13, completely replacing image segment 12. The problem is that image segment 10 has a small orange contribution on the right side, while newly adjacent image segment 13 is yellow, not orange. Likewise, image segment 13 has a small black contribution on the left side, while newly adjacent image segment 10 is blue, not black.

FIG. 1D is an illustrative diagram showing the result of correcting the bleed or blur in the newly adjacent segments in accordance with an embodiment of the invention. After correction of the blur, the region on the right side of image segment 10 (now labeled 10/13) has a small yellow contribution from adjacent segment 13. In order to achieve this result, the right side of image segment 10 may be de-blurred of the orange contribution, and then re-blurred by the introduction of the yellow contribution. Similarly, after correction of the blur, the region of the left side of image segment 13 (now labeled 13/10) has a small blue contribution from adjacent segment 10. In order to achieve this result, the left side of image segment 13 may be de-blurred of the black contribution, and then re-blurred by the introduction of the blue contribution.

Figure 2:
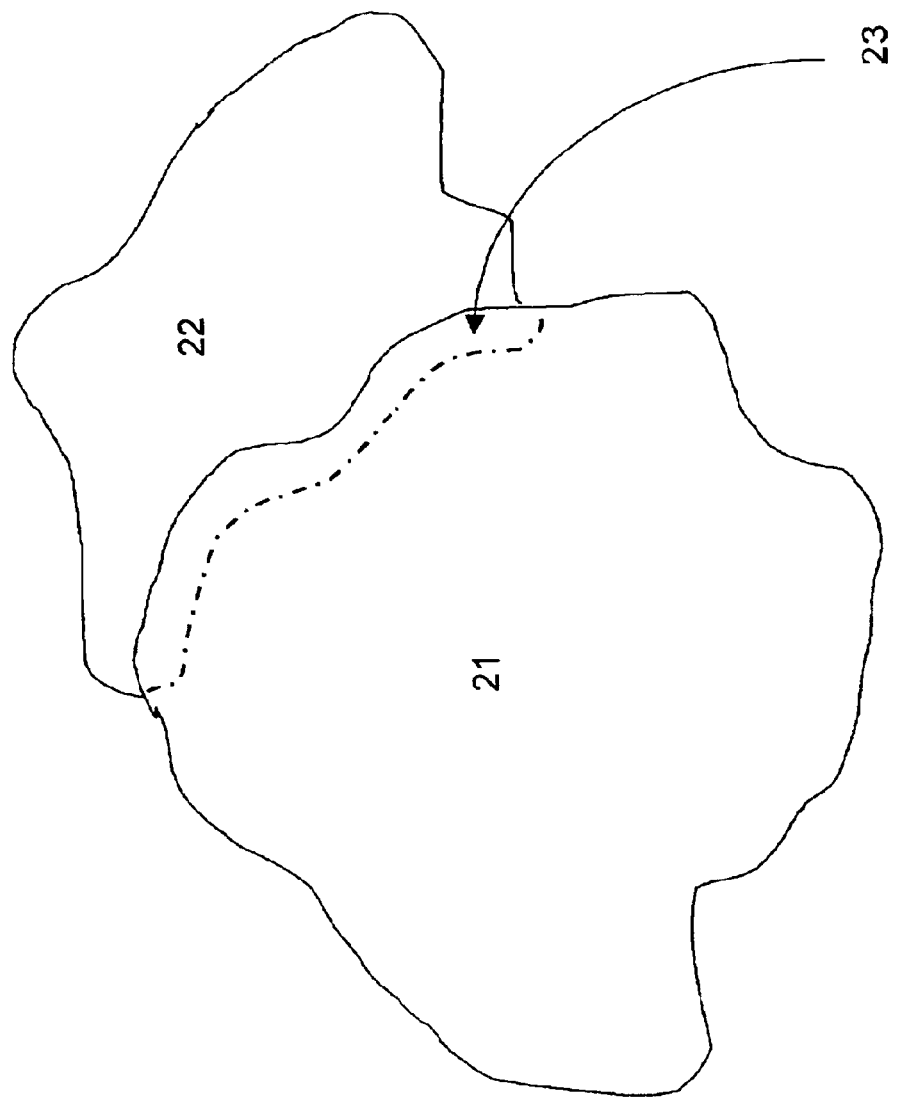
FIG. 2 is an illustrative example of two non-rectangular adjacent segments and a boundary region in one of the segments where bleed or blur correction is to be applied in accordance with an embodiment of the invention.

Note that the above-described FIGS. 1A–1D are simplified to illustrate concepts relating to the invention. However, typical image segments and blur regions need not be rectangular. For example, FIG. 2 illustrates non-rectangular segments and a corresponding non-rectangular blur region. In addition, the color in image segments are not typically as flat as illustrated. Instead, image segments may have variation in color on a rough or fine scale (maybe called texture for fine scale variation) as described-below in relation to FIG. 3. Furthermore, the color bleed from an adjacent segment into a blur region would generally not be uniform across the blur region. Rather, the blur would typically be stronger for pixels near the border and taper off (be weaker) for pixels farther away from the border.

FIG. 2 is an illustrative example of two non-rectangular adjacent segments and a boundary region in one of the segments where bleed or blur correction is to be applied in accordance with an embodiment of the invention. In FIG. 2 there are two arbitrary shaped image segments marked image segment 21 and image segment 22. Let segment 21 be the segment for which we illustrate the deblurring operation. Boundary region 23 represents the area near the edge between segments 21 and 22, where color from segment 22 bleeds into segment 21. Hence, region 23 includes pixels from segment 21 that requires de-blurring by removal of bleeding from segment 22.

Figure 3:
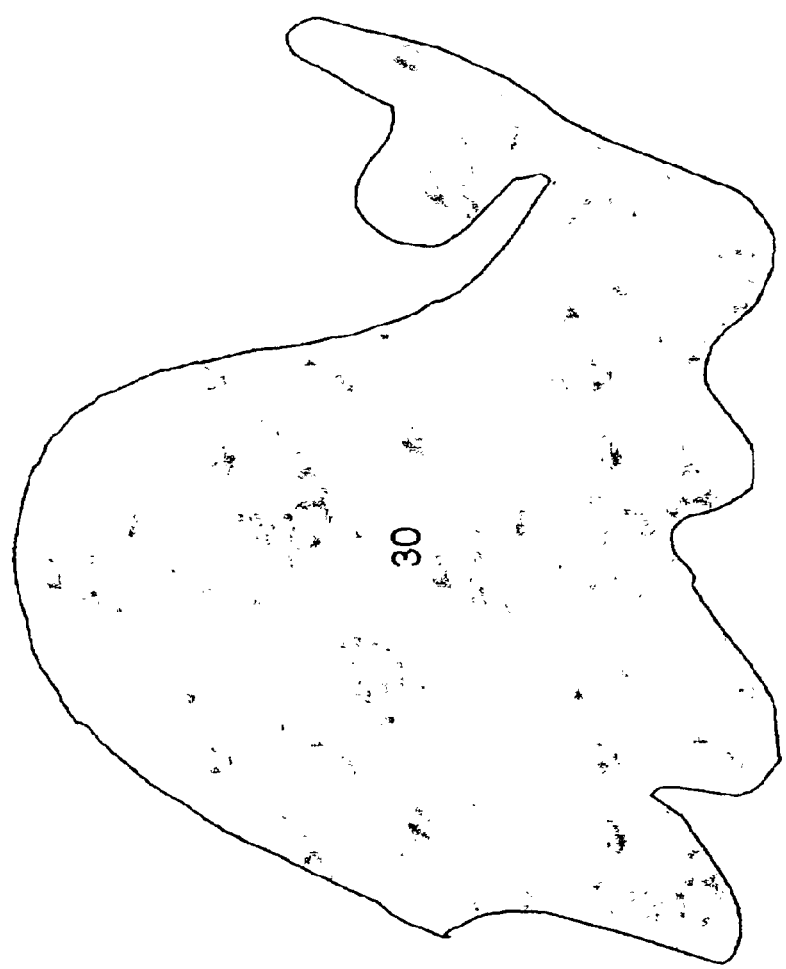
FIG. 3 is an illustrative example of a segment with texture.

FIG. 3 is an illustrative example of a segment showing the variation in color within it. The variation in color in the segment 30 is visibly illustrated by the grey-scale intensity variation. (Of course, color variation beyond grey-scale is intended.) If the colors of all of the image segments were statistically flat, then near the edges, one would see the color of one segment smoothly change into the colors of the adjacent segments solely as a result of blurring. Such variation in color would be solely attributed to the color contribution from the adjacent segments. In that case, one could use the exact color at a pixel to be de-blurred (such pixel being called the de-blur point) to determine the color bleeding from the adjacent segments.

However, given the color variation of a typical image segment as illustrated by FIG. 3, a representative or average color around the de-blur point should instead be used to determine the color bleeding from adjacent segments. This is because the color bleeding should be a smoothly varying function of distance from adjacent segments, so some sort of averaging should be applied to smoothen out the variation.

Figure 4:
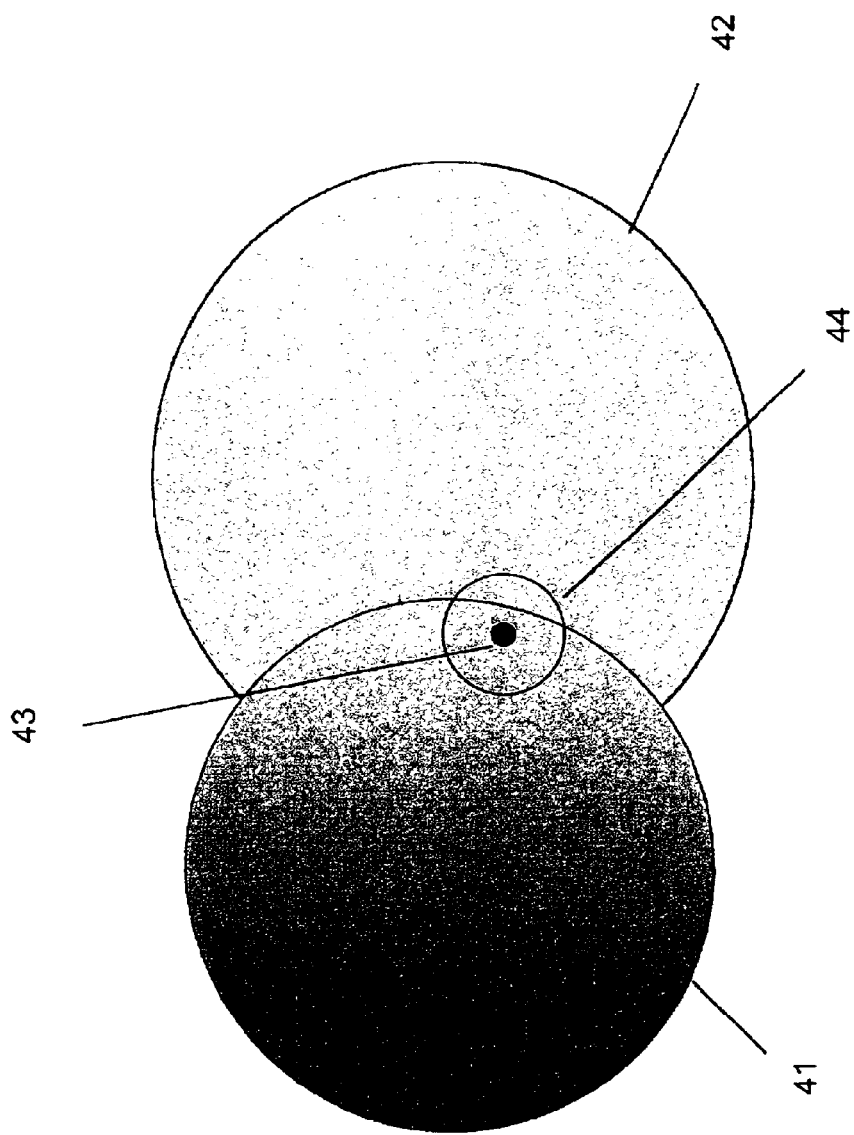
FIG. 4 depicts two image segments to illustrate determination of the representative color (a) at a de-blur point and (b) of the segment containing the de-blur point in accordance with an embodiment of the present invention.

FIG. 4 depicts two image segments to illustrate the determination of the representative colors (a) around a de-blur point and (b) of the segment containing the de-blur point in accordance with an embodiment of the present invention. A first step or method determines the local representative color at the de-blur point. A second step or method determines the representative color of the image segment containing the de-blur point. The two steps or methods are described below using a two-dimensional example.

The first step or method relates to determining the representative color at the de-blur point. This step or method involves a local area technique that considers the points within a pre-determined distance around the de-blur point. Two image segments, segments 41 and 42, are depicted in FIG. 4. Image segment 41 is primarily a dark segment with lighter colored pixels towards the border near image segment 42. Image segment 42 is a light colored segment. Pixel 43 is the designated de-blur point. Region 44 represents a local region around pixel 43. Note that region 44 may be circular as shown or of a different shape. Per this local area technique, pixels within local region 44 may be used to determine the representative color at the de-blur point. For example, the local representative color at the de-blur point 43 may be determined as the average color from the pixels that are within local region 44 (i.e., including pixels from both segments 41 and 42 that are within region 44). Taking such an average would yield a relatively light color for the local representative color at de-blur point 43. Alternate techniques include using, instead of a straight average, a weighted average or median. For example, pixels closer to the center of the local region 44 may be weighted more heavily. As another example, points in neighboring segment 42 may be ignored in doing the calculation to determine the local representative color.

The second step or method relates to determining the representative color of the image segment containing the de-blur point. This step or method may involve a broad area technique that considers all of the points within the image segment 41 containing the de-blur point 43. For example, the representative color of segment 41 may be determined by taking an average of all the pixel color values in image segment 41. Taking such an average would yield a medium dark color for the representative color of the segment 41. Alternate techniques include using, instead of a straight average, a weighted average or median. For example, pixels closer to either the center of the segment 41 or the de-blur point 43 may be weighted more heavily. Another alternate technique would be to average the colors of only those pixels at least a threshold distance away from the border of segment 41. Alternatively, this step or method may involve a local technique. For example, non-boundary points within a certain distance from the de-blur point 43 may be used to compute the representative color of segment 41 for purposes of the deblur operation.

Figure 5:
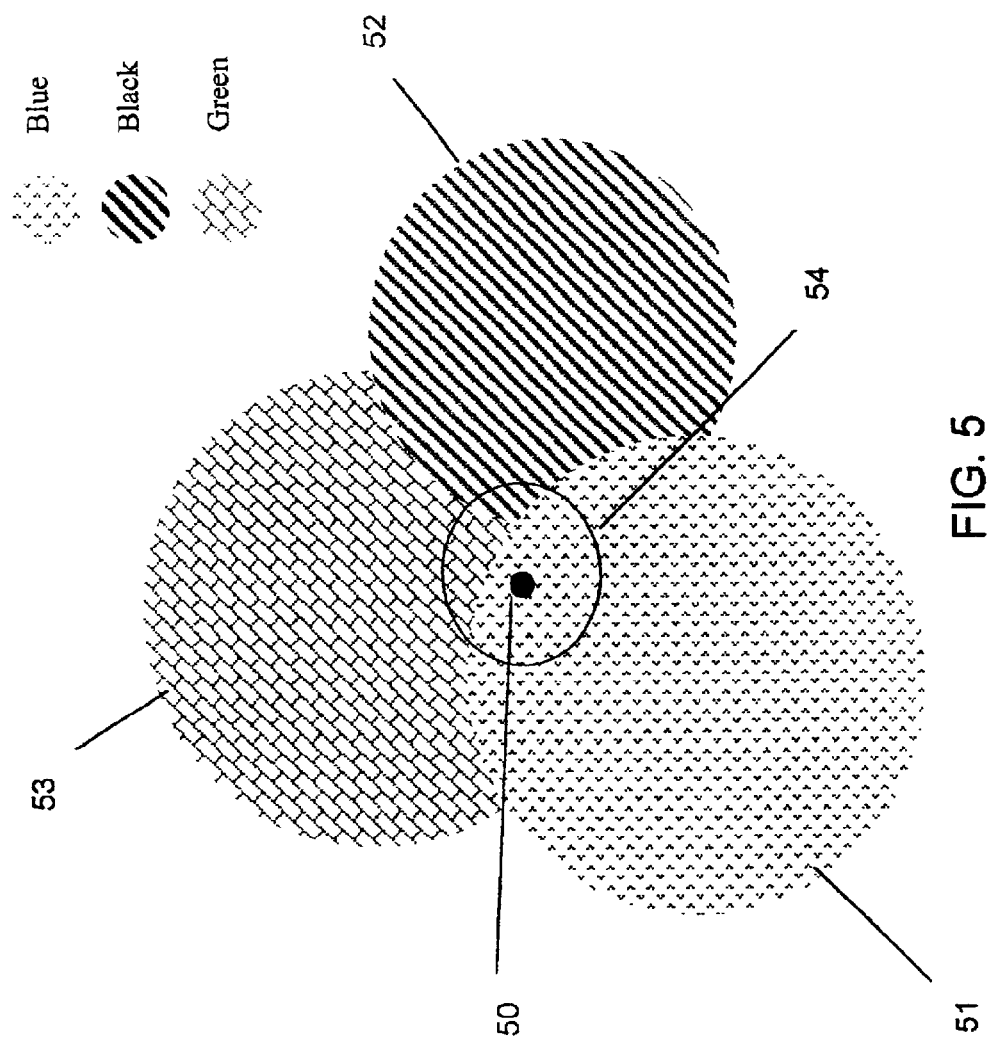
FIG. 5 depicts three image segments to illustrate determination of the color contribution of adjacent segment(s) in accordance with an embodiment of the invention.

FIG. 5 depicts three image segments to illustrate the determination of the color contribution from adjacent segment(s) in accordance with an embodiment of the present invention. As seen by the two-dimensional example in FIG. 5, there may be more than one adjacent segments that contribute to the color bleed at the de-blur point (two such segments 52 and 53 are shown).

In accordance with one embodiment of the invention, pixels in the intersection of each adjacent image segment with a pre-determined region around the de-blur point are considered. The pre-determined region may be, for example, a circle around the de-blur point. Regions with shapes other than circular may be used. A function is applied to the color values of the pixels in the intersection of each adjacent image segment and the pre-determined region to obtain a representative color for that adjacent segment. This function could be an averaging function, a weighted averaging function, a median, or any similar type function. Depicted in FIG. 5 are the de-blur point 50 and three image segments 51, 52 and 53. Point 50 is within segment 51. There is a pre-determined region around point 50. This region is designated region 54. Those pixels that are both in region 54 and adjacent segment 52 are considered to calculate the representative color of adjacent segment 52. Similarly, those pixels that are both in region 54 and adjacent segment 53 are considered to calculate the representative color of adjacent segment 53. Alternatively, the representative colors for segments 52 and 53 don't have to come from within local region 54.

In addition to determining the representative color of each adjacent image segment, the relative percentage contribution of each segment is to be determined. For example, the percentage contribution of a given image segment may be computed by simply computing the number of pixels of a given image segment contained within the pre-determined neighborhood of the blur point, divided by the total number of pixels in the given neighborhood in the adjacent image segments. Referring again to FIG. 5, assume for purposes of discussion that there are seventy (70) pixels that are in adjacent segment 53 that are also within region 54. Also assume there are thirty (30) pixels in adjacent segment 52 that are also within region 54. The total number of pixels in adjacent segments is then 100. Therefore, adjacent segment 53 contributes seventy percent (70%) of the color contribution at the current de-blur point 50 and adjacent segment 52 contributes thirty percent (30%) of the color contribution at the de-blur point 50. The multiple representative colors are weighted in accordance with their percentage contributions and added together to come up with a composite color contribution for the combined adjacent segments. In a different situation, there may be only one adjacent segment (instead of two) intersecting the region 54. In that case, the single adjacent segment would contribute one hundred percent (100%) of the color contribution at de-blur point 50.

FIG. 6 is a flow chart illustrating a process or method for de-blurring in accordance with an embodiment of the invention. The process as depicted includes eight steps. The process may be performed, for example, in a video encoder apparatus. The process may also be performed in a video decoder apparatus.

In a first step 61, the process begins with the selection of the segment to be de-blurred. The selection of the segment may be from a segment list as described further below in relation to FIGS. 10–12.

In a second step 62, a pixel is selected in a boundary region of the segment. The boundary region comprises the pixels to be de-blurred within the segment. An illustrative example of such a boundary region is region 23 of segment 21 in FIG. 2 described above. The next three steps, steps 63–65, may occur in parallel in that they do not necessarily depend on each other. For example, the boundary region may be of fixed width. In another example, the boundary region may include the area where a color gradient is above a certain threshold value. Various other ways of determine the boundary region are also contemplated.

In the third step 63, the representative color at the selected pixel is determined. The representative color at the pixel may be a local average of color around the selected pixel. For example, the first technique described above in relation to FIG. 4 may be used by an encoder to determine the representative color at the selected de-blur point. The resulting representative color at the de-blur point is depicted as three-component color vector C3(x) in FIG. 7A, where x is the two-dimensional position vector of the de-blur point.

In the fourth step 64, the representative color of the selected segment is determined. The representative color of the segment to be de-blurred may be a broad average over pixels in the segment. For example, the second technique described above in relation to FIG. 4 may be used to determine the representative color of the segment. The resulting representative color of the segment is depicted as three-component color vector C1(x) in FIG. 7A. As indicated, the representative color of the segment C1(x) may depend on the de-blur point x under consideration.

In the fifth step 65, the color contribution of the adjacent segment(s) is determined. There may be one or more such adjacent segments. For example, the technique described above in relation to FIG. 5 may determine the representative color at one or more adjacent segments. The resulting color contribution is depicted as three-component color vector C2 in FIG. 7A. Note that C2 may depend upon the particular pixel x, hence it may be denoted as C2(x).

A sixth step 66 depends on the output from the preceding three steps 63–65. The sixth step 66 calculates a blur coefficient for the selected pixel. The blur coefficient may be called $\alpha$. The blur coefficient $\alpha$ may be calculated, for example, as described below in relation to FIG. 7B. Note that the blue coefficient a depends upon the particular pixel x, hence the blur coefficient may be denoted as $\alpha(x)$.

A seventh step 67 determines if there are more pixels to process. If there are more pixels near the boundary in need of processing, then the process loops back to the second step 62 for selection of another pixel to have its blur coefficient $\alpha$ calculated. When there are no more pixels near the boundary in need of processing, then the process moves on to the eighth step 68.

The eighth step 68 applies the blur coefficients $\alpha(x)$ to remove the blur from the segment. The blur coefficients a indicate the color bleed or blur to be removed from pixels near the boundary of the segment. As described below in relation to FIG. 7B, the color blur $\Delta(\alpha)(x)$ at a pixel is proportional to the blur coefficient $\alpha$ at that pixel. Removal of the color blur $\Delta(\alpha)$ from a pixel color C to generate a de-blurred pixel color C* is depicted in FIG. 7C.

Figure 7A:
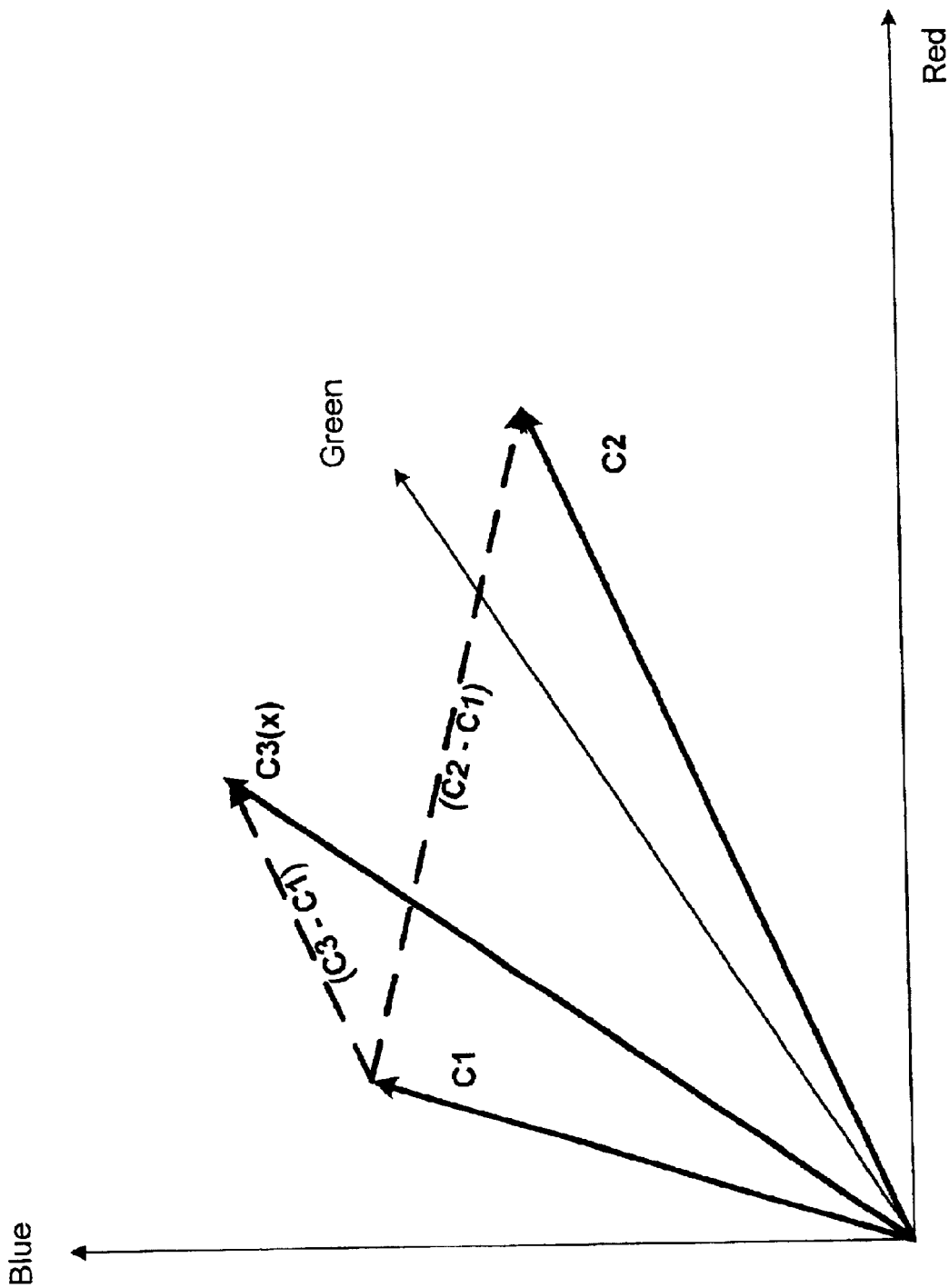
FIG. 7A is a vector diagram showing various color vectors relevant to de-blurring in accordance with an embodiment of the present invention.

FIG. 7A is a vector diagram showing various color vectors relevant to de-blurring in accordance with an embodiment of the present invention. The color vectors shown include vectors representing color in the first segment to be de-blurred, in a second segment adjacent to the first segment, and at a point x to be de-blurred in the first segment. Note that while three-component color vectors in FIG. 7A are depicted in RGB color space, typical video applications will represent colors in YUV color space. The present invention is not dependent on a particular color space and is instead operable in any one of various color spaces.

Consider first and second image segments that are neighboring each other, and a transition region to be de-blurred at the boundary between the two segments. Further, consider a pixel to be de-blurred at two-dimensional position vector x that lies in the region to be de-blurred. C3(x) is the representative color at position vector x and may be determined as described in relation to FIG. 4. C1(x) is the representative color of the first segment (containing the pixel at x) to be de-blurred and may also be determined as described above in relation to FIG. 4. C2(x) is the color contribution of the "second segment" [the adjacent segment(s) that contributes color bleed into the pixel x] and may be determined as described above in relation to FIG. 5.

In addition, a couple of difference vectors are shown in FIG. 7A. A first difference vector (C2–C1) starts at C1 and ends at C2. "Physically," (C2–C1) indicates the direction in which the colors blur from C1 to C2. A second difference vector (C3–C1) starts at C1 and ends at C3. Physically, (C3−C1) represents how much the color at the de-blur point differs from its segment color. The difference that is parallel to (C2−C1) is assumed to come from the blurring.

Figure 7B:
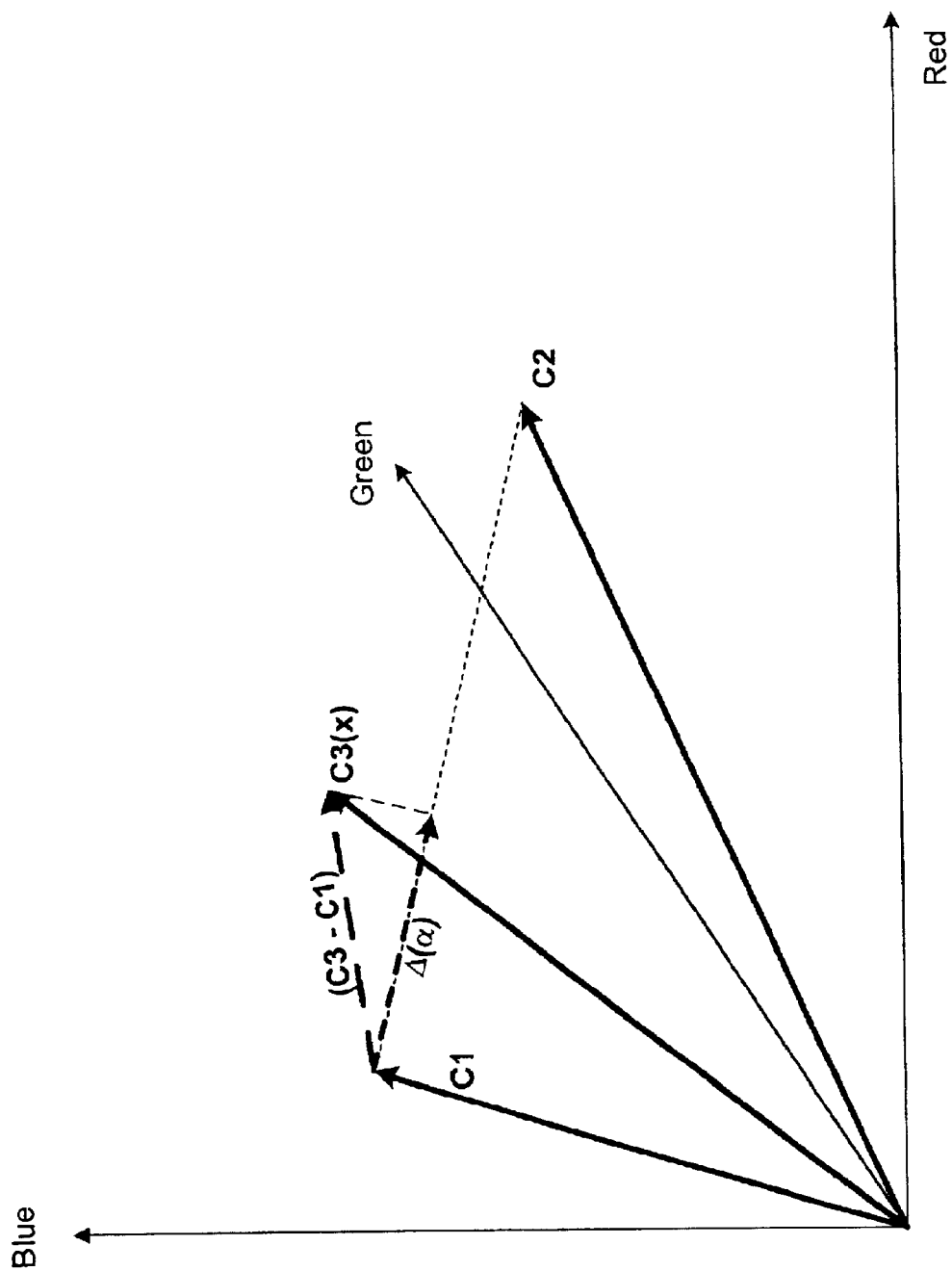
FIG. 7B is a vector diagram showing the projection of the second difference vector (C3−C1) onto the first difference vector (C2−C1) in accordance with an embodiment of the present invention.
Figure 7C:
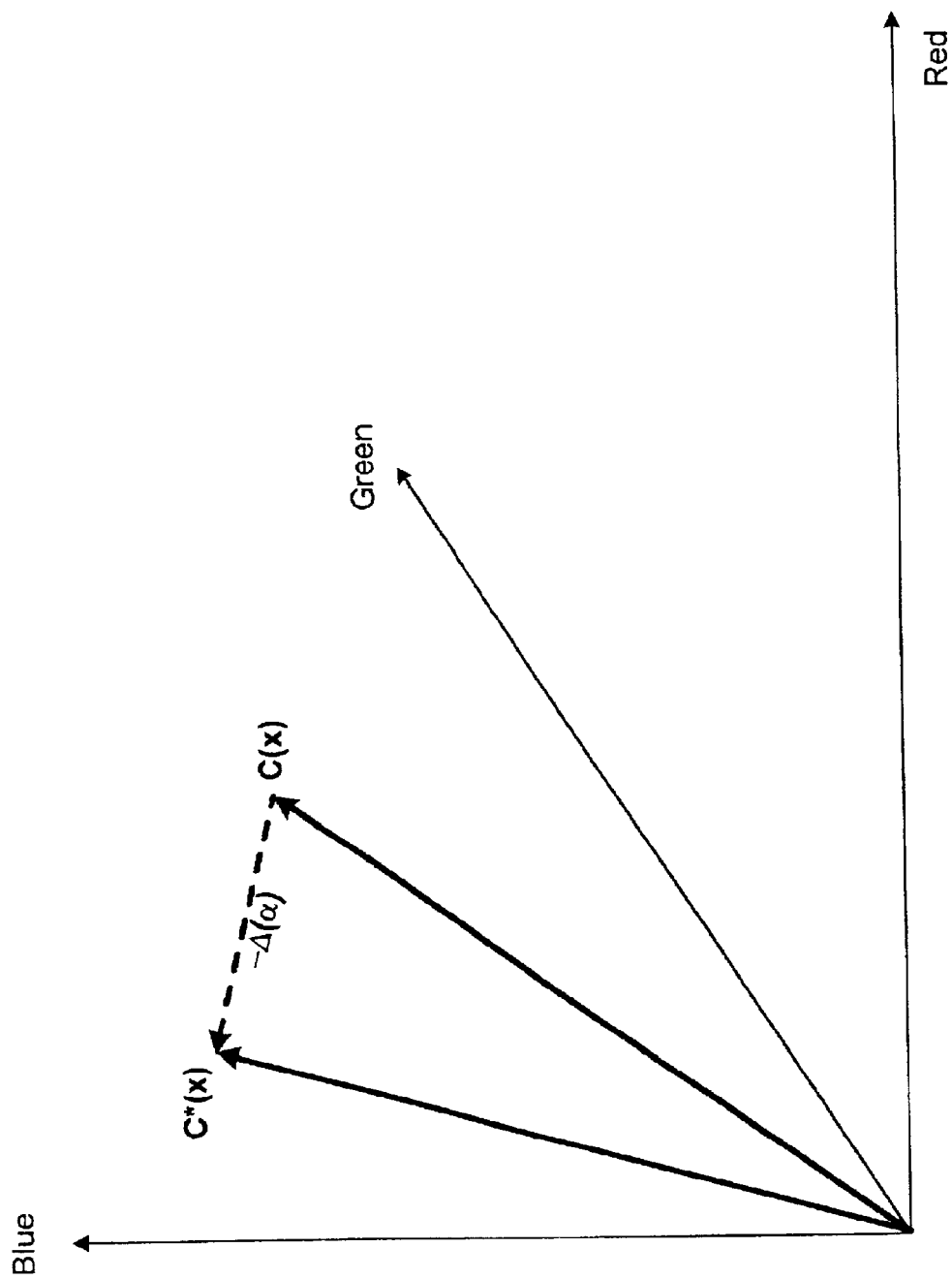
FIG. 7C is a vector diagram showing the de-blurring of the pixel color C(x) for the pixel located at position vector x (the de-blur point).

FIG. 7B is a vector diagram showing the projection of the second difference vector (C3−C1) onto the first difference vector (C2−C1) in accordance with an embodiment of the present invention. The result is the blur contribution or blur vector Δ(α). The blur vector Δ(α) represents the color blur (bleed) from the "second segment" onto the pixel at position vector x and may be given by the following equation.

$$\Delta(\alpha) = \alpha(C2-C1) \tag{Equation 1}$$

where the scalar variable α is called the blur coefficient and determines the amount of blur or bleed. In accordance with an embodiment of the present invention, the blur coefficient α is given by the following equation.

$$\alpha = \frac{(C3-C1)\cdot(C2-C1)}{(C2-C1)\cdot(C2-C1)} \tag{Equation 2}$$

where • represents a vector dot product. Physically, the blur coefficient a is the ratio of the length of the blur vector Δ(α) to the length of the "total" blur vector (C2−C1). Ideally, the blur coefficient a should range from zero (0) to one (1). In practice, due to imperfect computations of C1, C2, and C3, a could be less than zero or greater than one. If α is negative, then a may be clipped to zero so no de-blurring is done. Similarly, α may be clipped to one if it exceeds one. In other words, zero is the minimum value for α, and one is the maximum value for α. Alternatively, α may not be so restricted to be between zero and one. As noted above, α depends on x and so may be denoted α(x).

FIG. 7C is a vector diagram showing the de-blurring of the pixel color C(x) for the pixel located at position vector x (the de-blur point). As shown in FIG. 7C, the pixel color C(x) is de-blurred by subtracting the blur vector Δ(α) from C(x). This results in the de-blurred pixel color that may be denoted as C*(x).

Note that the pixel color C(x) in FIG. 7C is generally different from the representative color C3(x) in FIG. 7B. The pixel color C(x) is specific to the color at the de-blur point while the representative color C3(x) may be some kind of local average of color around the de-blur point, for example, as determined in the first technique described in relation to FIG. 4. In other words, the pixel color C(x) is equal to the representative color C3(x) plus a color fluctuation specific to each pixel x. The color fluctuation may be attributed, for example, to fine-scale color variations due to texture.

Figure 8:
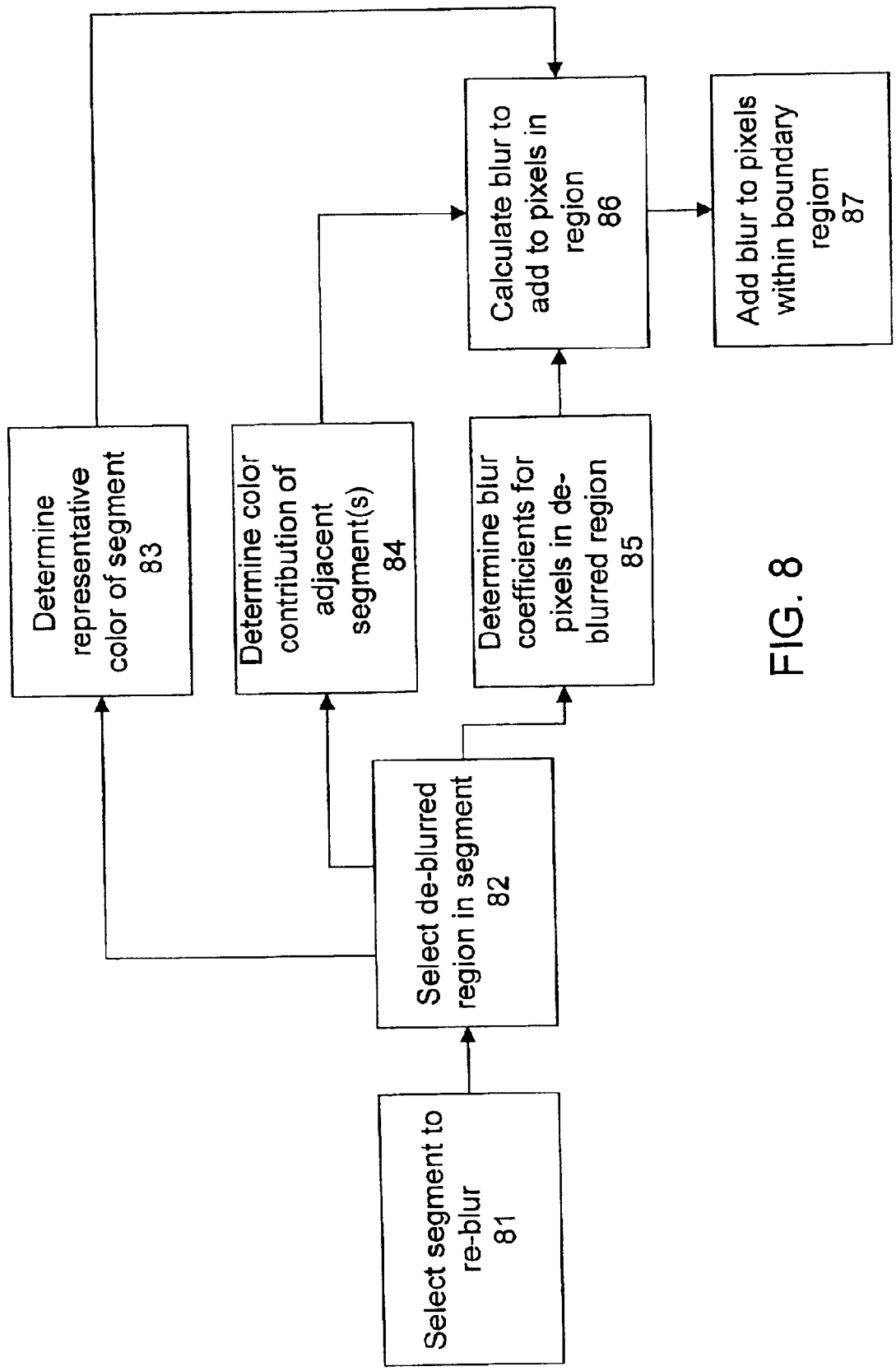
FIG. 8 is a flow chart illustrating a process or method for re-blurring in accordance with an embodiment of the invention.

FIG. 8 is a flow chart illustrating a process or method for re-blurring in accordance with an embodiment of the invention. The process as depicted includes seven steps. The process may be performed, for example, in a video encoder apparatus and/or a video decoder apparatus.

In a first step 81, the process begins with selection of the segment to be re-blurred. The segment selected should have, at some preceding time, been de-blurred. Selection of the segment may be from a segment list as described further below in relation to FIGS. 10–12.

In a second step 82, a pixel is selected in a boundary region of the segment. The boundary region comprises the pixels to be re-blurred within the segment. An illustrative example of such a boundary region is region 23 of segment 21 in FIG. 2 described above. The next three steps, steps 83–85, may occur in parallel in that they do not necessarily depend on each other.

In the third step 83, the representative color of the selected segment is determined. The representative color of the segment to be re-blurred may be a broad average over pixels in the segment. In accordance with one embodiment, the second technique described above in relation to FIG. 4 may be used by an encoder and/or a decoder to determine the representative color of the segment to be re-blurred. The resulting representative color is depicted as three-component color vector C1(x) in FIG. 9A.

In the fourth step 84, the color contribution of the adjacent segment(s) is determined. There may be one or more such adjacent segments. In accordance with one embodiment, the technique described above in relation to FIG. 5 may be used by an encoder and/or a decoder to determine the color contribution of the adjacent segment(s). The resulting color contribution of the adjacent segment(s) is depicted as three-component color vector C2(x) in FIG. 9A.

In the fifth step 85, blur coefficients are determined for pixels in the boundary region. The blur coefficients may be denoted α(x). In accordance with one embodiment of the invention, the blur coefficients a are computed earlier in the process, so the determination of the blur coefficients α becomes a process of choosing the correct blur coefficient α for each pixel to be re-blurred.

In the sixth step 86, the blur vectors Δ(α) are calculated using the blur coefficients α. This calculation may be done in accordance with Equation 1 (described above in relation to FIG. 7B).

The seventh step 87 adds the blur vectors Δ(α) to the de-blurred pixel colors C*(x). Addition of the color blurs Δ(α) to a de-blurred pixel colors C* generates re-blurred pixel colors C as depicted in FIG. 9B.

Figure 9A:
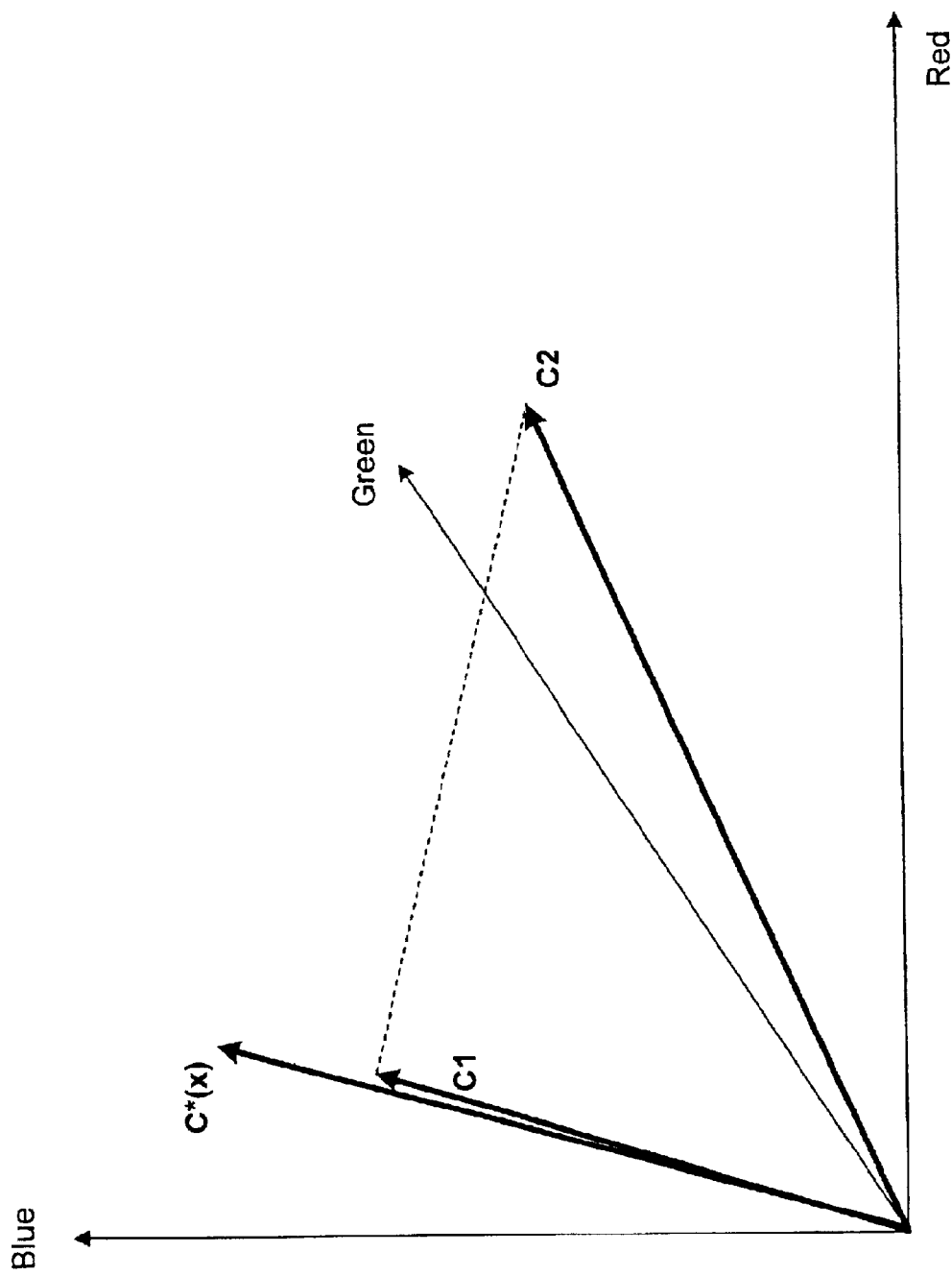
FIG. 9A is a vector diagram showing various color vectors relevant to re-blurring in accordance with an embodiment of the present invention.

FIG. 9A is a vector diagram showing various color vectors relevant to re-blurring in accordance with an embodiment of the present invention. The color vectors shown include vectors of a representative color of a first segment to be re-blurred, C1, of the de-blurred pixel color in the first segment, C*(x), and of the color contribution from adjacent segments, C2(x). Note again that while three-component color vectors in FIG. 9A are depicted in RGB color space, typical video applications will represent colors in YUV color space.

Figure 9B:
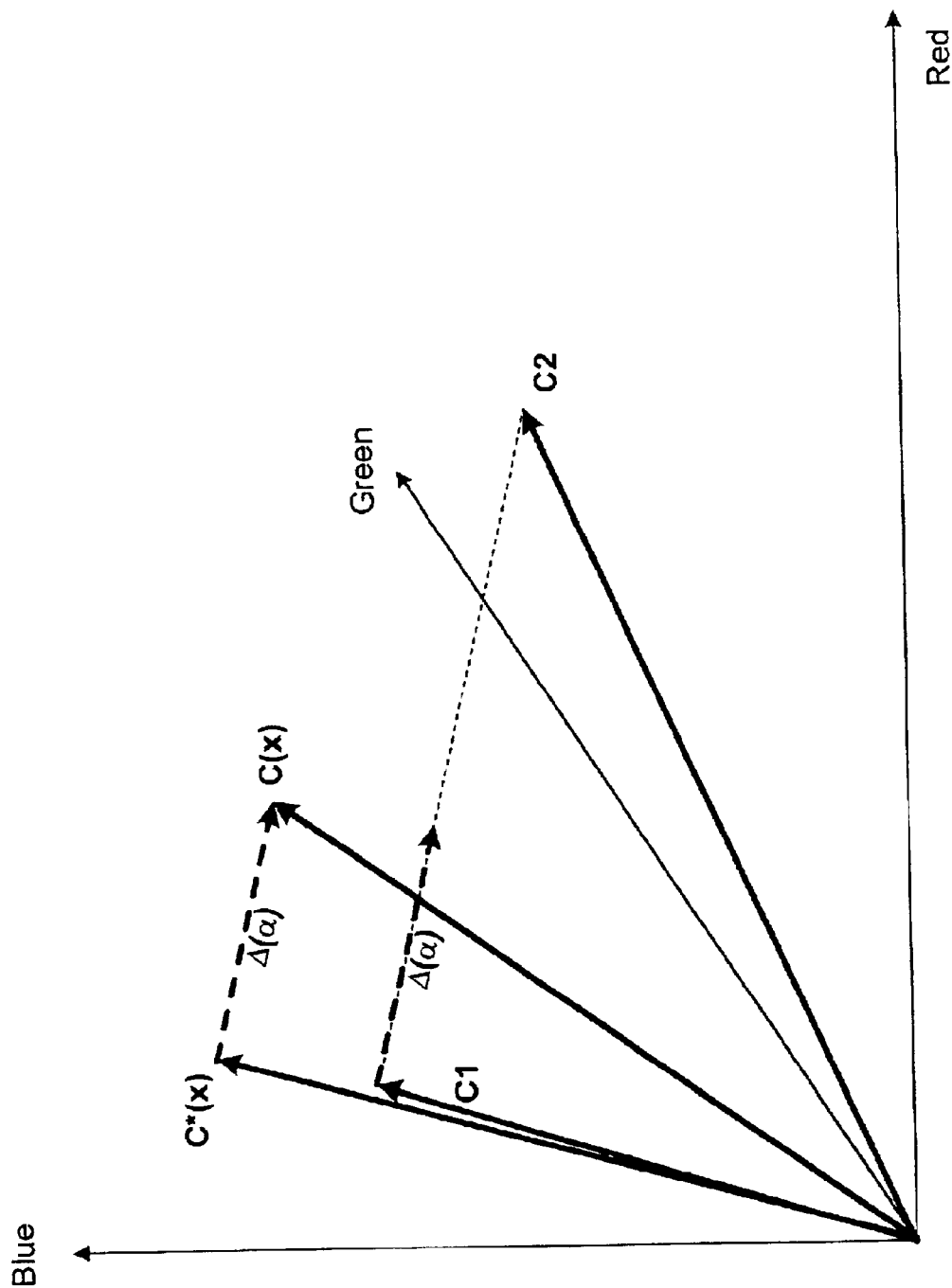
FIG. 9B is a vector diagram depicting the re-blurring from the de-blurred pixel color, C*(x), to the re-blurred pixel color, C(x).

FIG. 9B is a vector diagram depicting the re-blurring from the de-blurred pixel color, C*(x), to the re-blurred pixel color, C(x). The blur vector Δ(α) is shown to lie in the direction of the difference vector (C2−C1). The re-blurred pixel color C(x) is given by the following equation.

$$C(x) = C^*(x) + \Delta(\alpha) \tag{Equation 3}$$

Figure 10:
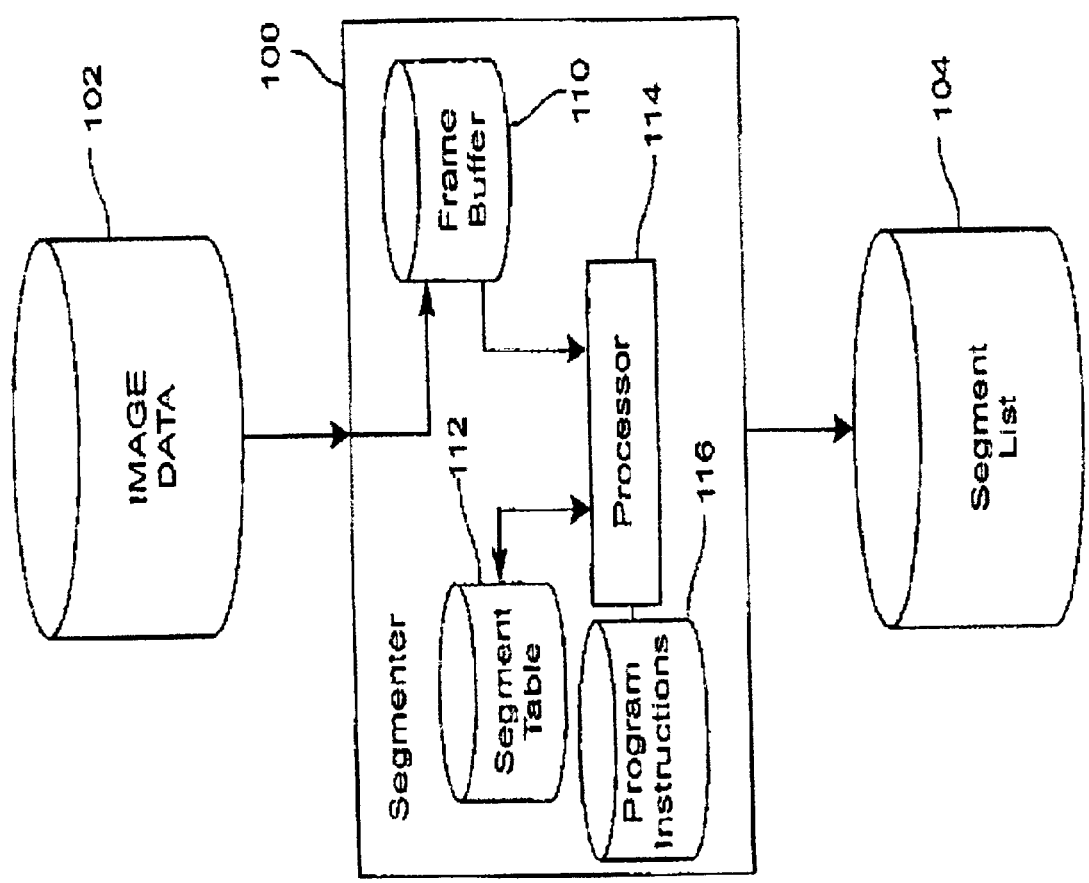
FIG. 10 is a diagram of an apparatus for segmenting images in accordance with an embodiment of the invention.

FIG. 10 is a diagram of an apparatus for segmenting images in accordance with an embodiment of the invention. The apparatus includes a segmenter 100 that generates segment definitions for an image. Segmenter 100 accepts as its input image data 102 and outputs a segment list 104. The format of image data 102 and segment list 104 can vary depending on the nature of the image, its storage requirements and other processing not related to the segmentation process, but one form of storage for image data 102 is an array of pixel color values, possibly compressed, and stored in one of many possible industry-standard image formats, such as raw data, bitmaps, MPEG, JPEG, GIF, etc. In memory, image data 102 may be stored as a two-dimensional array of values, where each value is a pixel color value. The pixel color value may have several components. For example, an image may be a 1024 by 768 array of pixels, with each pixel's color value represented by three (red, green, blue) component values ranging from 0 to 255. The format of segment list 104 may be stored as a run-length encoded ordered list of mid-pixels or image pixels that comprise the bounds of each segment.

Segmenter 100 is shown comprising a frame buffer 110 that holds the image data as it is being considered, a segment table 112 that holds data about the segments identified or to be identified, and a processor 114 that operates on frame buffer 110 to generate segment data according to program instructions 116 provided in segmenter 100. The program instructions 116 may include program instructions corresponding to processes for segmentation and in support of segmentation. Further description of the operation of an example segmenter is provided in "Method and Apparatus for Digital Image Segmentation," International Publication Number WO 00/77735 A1, published Dec. 21, 2000, by applicant Pulsent Corporation.

Figure 11:
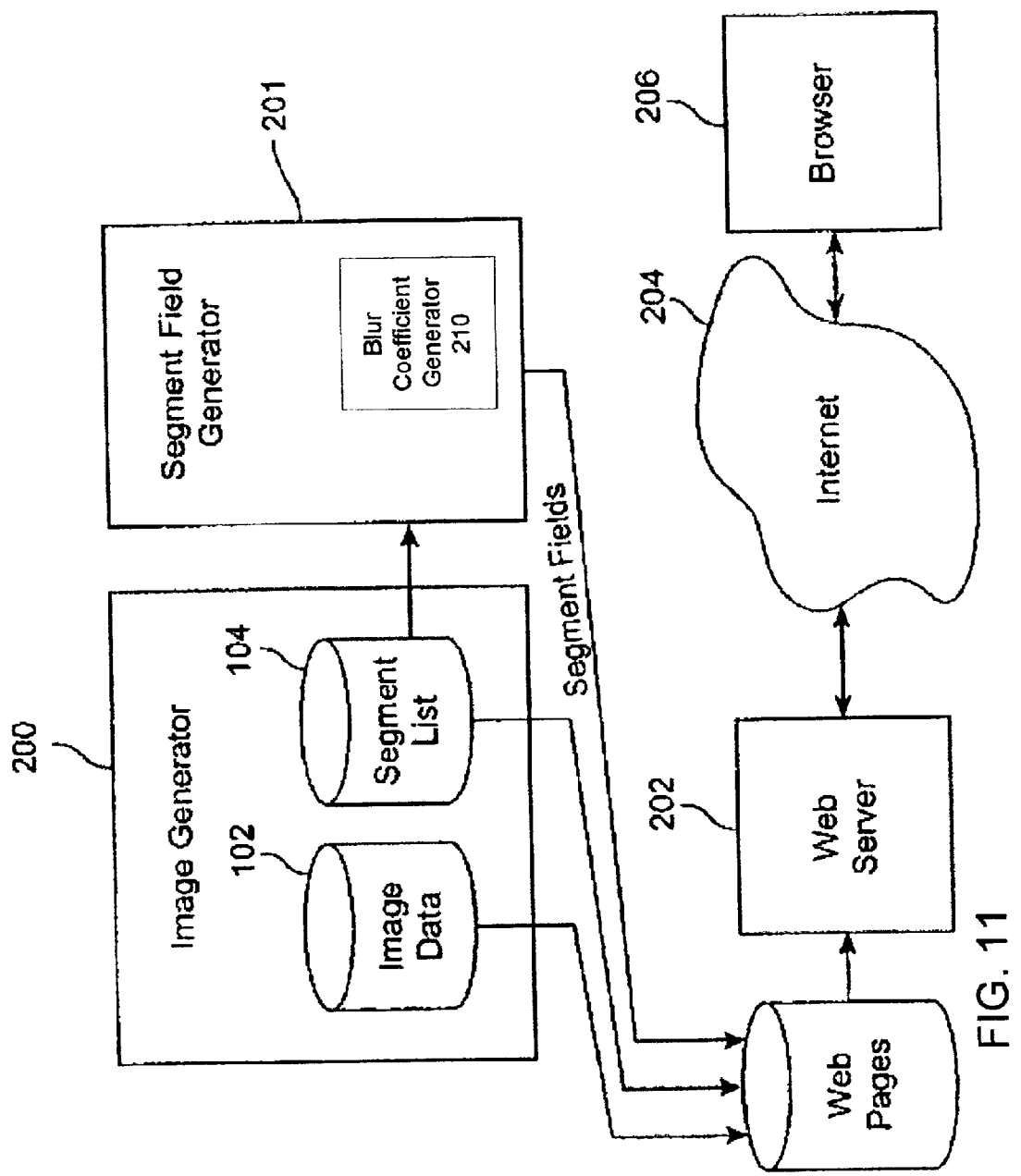
FIG. 11 is a diagram of a system in which a segmented image might be used in accordance with an embodiment of the invention.

FIG. 11 is a diagram of a system in which a segmented list might be used in accordance with an embodiment of the invention. As shown in FIG. 11, an image generator 200 generates an image, possibly using conventional image generation or image capture techniques, and stores data representing that image as image data 102. A segmenter, such as segmenter 100 shown in FIG. 10, is used to generate segment list 104 as described above. Image generator 200 provides segment list 104 to a segment field generator 201 that generates data for each of the segments. Such data might include a label, a clickable link (such as a Uniform Resource Locator or URL), and other data associated with segments of the image.

In the particular embodiment illustrated in FIG. 11, image data 102, segment list 104, and the segment fields may be stored as web pages to be served by a web server 202. The image and related data can then be retrieved from web server 202 over Internet 204 by a browser 206 or other web client (not shown). Other embodiments may provide access to the data without use of web-related technology.

In accordance with one embodiment of the invention, the segment field generator 201 includes a blur coefficient generator 210. The blur coefficient generator 210 generates the blur coefficients α that are described above.

Figure 12:
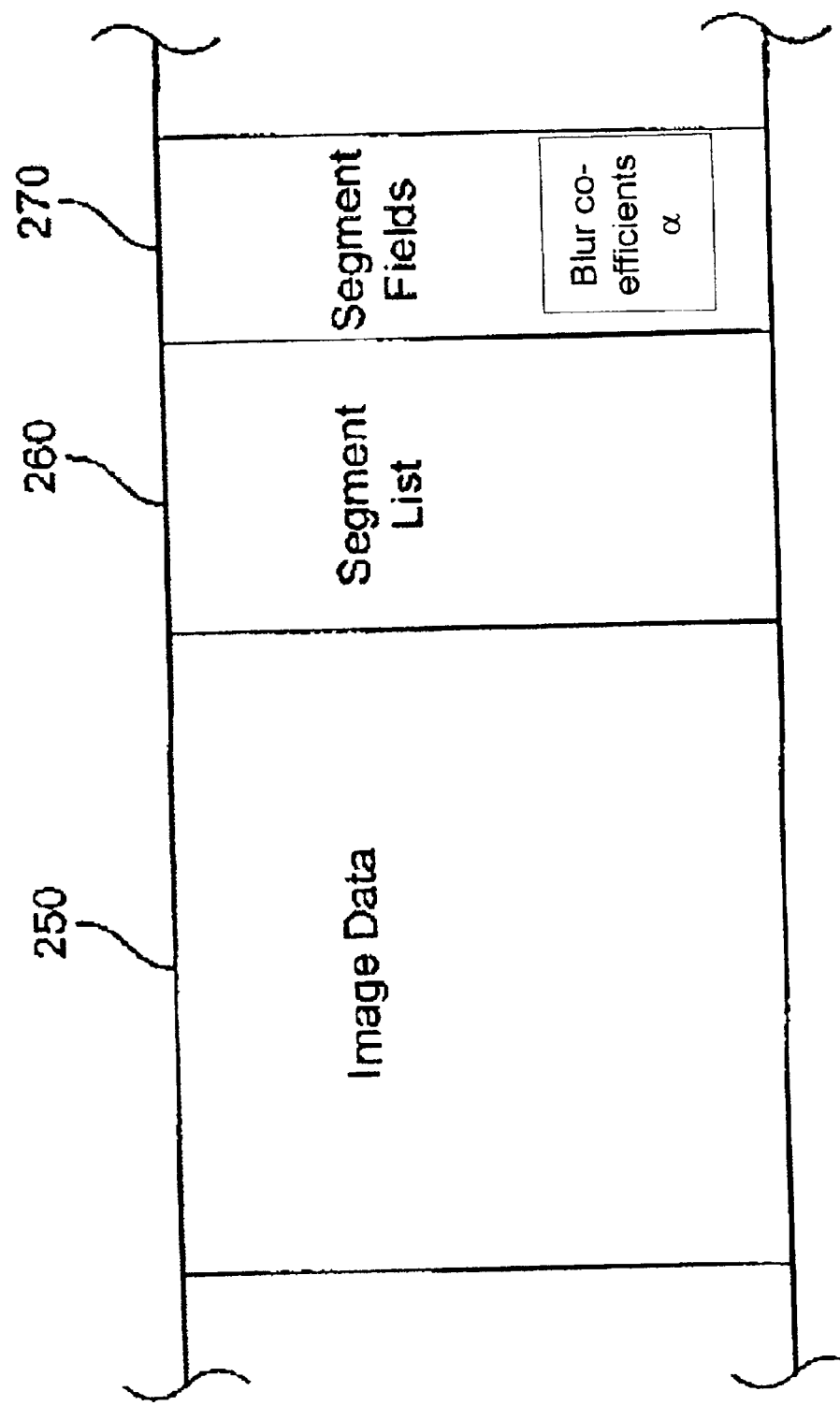
FIG. 12 is an illustration of a data stream comprising an image and related segment data in accordance with an embodiment of the invention.

FIG. 12 is an illustration of a data stream comprising an image and related segment data in accordance with an embodiment of the invention. One possible arrangement of the data is shown by FIG. 12 and other arrangements are, of course, possible. In the particular example shown in FIG. 12, the image data 250 is transmitted as a signal (possibly in an industry-standard format) followed by the segment list 260 and segment fields 270. In another embodiment, the segment list is created by the decoder and does not need to be sent.

In accordance with one embodiment of the invention, the segment fields 270 may include blur coefficients α. In accordance with that embodiment, the blur coefficients are provided to a decoder. In accordance with other embodiments, the blur coefficients may be calculated by the decoder, saving transmission bandwidth.

FIG. 13 is a graph depicting in a conceptual way color blurring between two adjacent segments in accordance with an embodiment of the invention. FIG. 13 is not meant to be accurate in detail, but rather to be a conceptual illustration. The graph has distance x along one dimension as the horizontal axis and one-component of color for the vertical axis. The first segment 301 is located to the left of vertical line 303, and the second segment is located to the right of vertical line 303.

As depicted in FIG. 13, the pixel color C(x) transitions from a relatively low value of the color component in the first segment 301 to a relatively high value of the color component in the second segment 302. The variations (oscillations) shown in C(x) are meant to illustrate the fact that the pixel color may have texture, instead of being flat. These variations are not meant to necessarily be of a realistic scale. The transition between lower and higher value in color component is depicted as occurring in a transition zone between vertical lines 304 and 305. Further depicted outside the transition zone are the representative color C1 of the first segment 301 and the representative color C2 of the second segment 302. Within the transition zone, the representative color C3(x) is shown for the "blurred" pixels. Those pixels between lines 304 and 303 are pixels within the first segment 301 that have color bleed from the second segment 302, while those pixels between lines 305 and 303 are pixels within the second segment 302 that have color bleed from the second segment 301. As depicted in FIG. 13, the representative color C3(x) is a relatively smooth function that follows the overall curve of the pixel color C(x) in the transition zone (but not the fine variation due to texture).

Reference throughout this specification to "one embodiment" or "an embodiment" or the like means that a particular feature, structure, or characteristic described in connection with the embodiment is included in at least one embodiment of the present invention. Thus, the appearances of the phrases "in one embodiment" or "in an embodiment" or the like in various places throughout this specification are not necessarily all referring to the same embodiment. Furthermore, the particular features, structures, or characteristics may be combined in any suitable manner in one or more embodiments.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of de-blurring a segment of an image, the method comprising:

selecting the segment;

identifying pixels of interest near a boundary of the segment;

calculating blur contributions for the pixels by determining a first color vector relating to the segment, a second color vector relating to at least one adjacent segment in proximity to the pixels, and a third color vector relating to the pixels, wherein the blur contributions are in a same direction as a first difference vector comprising the second color vector minus the first color vector and comprise projections of a second difference vector onto the first difference vector, wherein the second difference vector comprises the third color vector minus the first color vector; and subtracting the blur contributions from color vectors of the pixels to remove blurring from the segment.

2. The method of claim 1, wherein the first color vector comprises a representative color of the segment, the second color vector comprises a color contribution of the at least one adjacent segment, and the third color vector comprises representative colors of the pixels.

3. A method of de-blurring a segment of an image, the method comprising:

selecting the segment;

identifying pixels of interest near a boundary of the segment;

calculating blur contributions for the pixels by determining a first color vector relating to the segment, a second color vector relating to at least one adjacent segment in proximity to the pixels, and a third color vector relating to the pixels, wherein the blur contributions are in a same direction as a first difference vector comprising the second color vector minus the first color vector and are proportional to a blur coefficient, wherein the blur coefficient comprises a first dot product between the second and first difference vectors divided by a second dot product between two first difference vectors; and subtracting the blur contributions from color vectors of the pixels to remove blurring from the segment.

4. The method of claim 3, wherein the blur coefficients are calculated by an image processing apparatus.

5. The method of claim 3, wherein the blur coefficients are calculated by a video processing apparatus.

6. The method of claim 3, wherein the blur coefficients are provided as segment field data relating to the segment.

7. A method of blurring a two-dimensional segment of an image, the method comprising:

selecting the two-dimensional segment;

identifying boundary pixels in a boundary region near a border between the two-dimensional segment and one or more adjacent two-dimensional segments;

determining blur contributions to the boundary pixels from the one or more adjacent two-dimensional segments; and adding the blur contributions to color vectors of the boundary pixels to add blurring to the two-dimensional segment.

8. The method of claim 7, wherein calculating the blur contributions comprises:

determining a first color vector relating to the two-dimensional segment;

determining a second color vector relating to at least one adjacent two-dimensional segment in proximity to the boundary pixels; and determining a measure of blurring relating to the boundary pixels.

9. The method of claim 8, wherein the blur contributions are in a same direction as a first difference vector comprising the second color vector minus the first color vector.

10. The method of claim 8, wherein the first color vector comprises a representative color of the two-dimensional segment, and the second color vector comprises a color contribution of the at least one adjacent segment.

11. The method of claim 8, wherein the measure of blurring comprises a blur coefficient.

12. The method of claim 11, wherein the blur coefficients are calculated by a video encoder apparatus.

13. The method of claim 11, wherein the blur coefficients are retrieved by a video decoder apparatus from segment field data relating to the two-dimensional segment.

14. An apparatus for determining blur contributions to a particular two-dimensional segment from adjacent two-dimensional segments of an image, the apparatus comprising:

means for selecting the particular two-dimensional segment;

means for identifying boundary pixels in a boundary region near a border between the particular two-dimensional and one or more adjacent two-dimensional segments; and means for determining the blur contributions for the boundary pixels from the adjacent two-dimensional segment;

means for subtracting the blur contributions from color vectors of the boundary pixels to remove blurring from the particular two-dimensional segment.

15. The apparatus of claim 14, further comprising:

means for calculating blur coefficients representing the blur contributions.

* * * * *